April 30, 1963  M. MARSHALL ETAL  3,087,195
APPARATUS FOR HOLDING CATTLE IN POSITION FOR SLAUGHTERING
Filed Aug. 23, 1961  7 Sheets-Sheet 1

INVENTORS.
Milton Marshall, Eugene W. Shultz
BY & Elwood E. Milbury,

Paul & Paul
ATTORNEYS.

April 30, 1963   M. MARSHALL ETAL   3,087,195
APPARATUS FOR HOLDING CATTLE IN POSITION FOR SLAUGHTERING
Filed Aug. 23, 1961   7 Sheets-Sheet 2
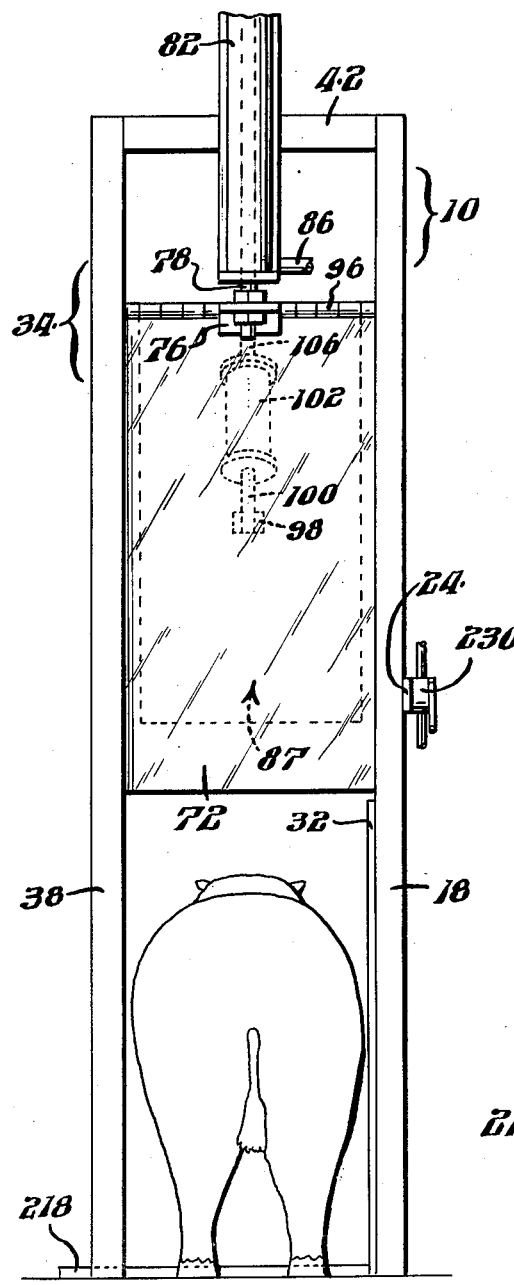
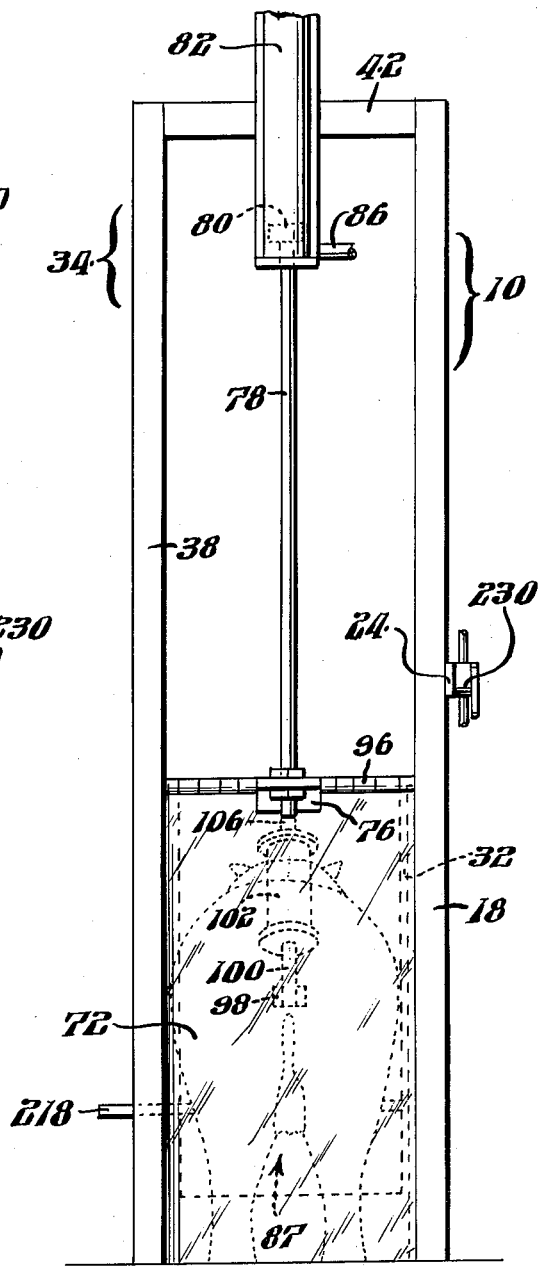
INVENTORS.
Milton Marshall, Eugene W. Shultz
BY & Elwood E. Milbury,
Paul & Paul
ATTORNEYS.

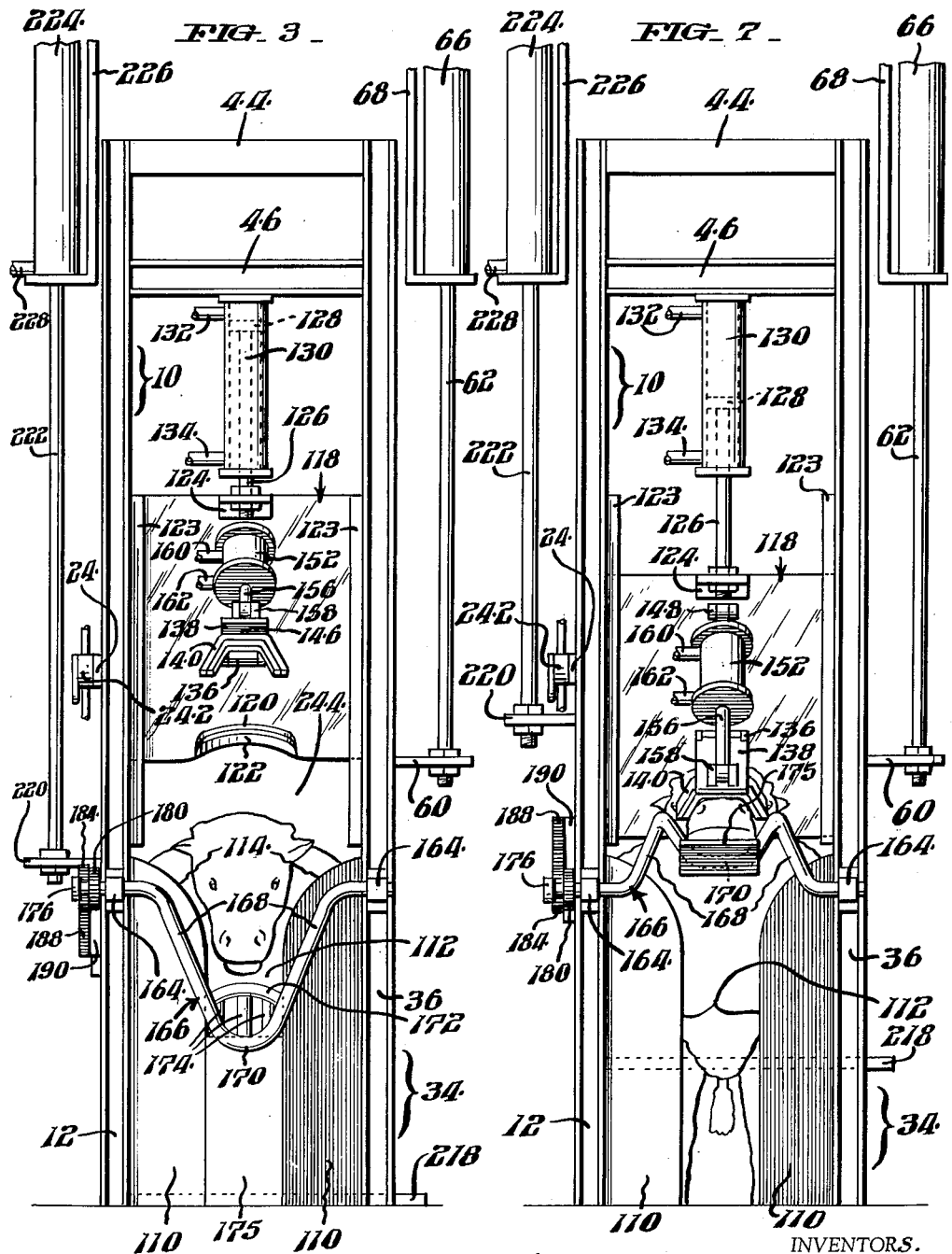

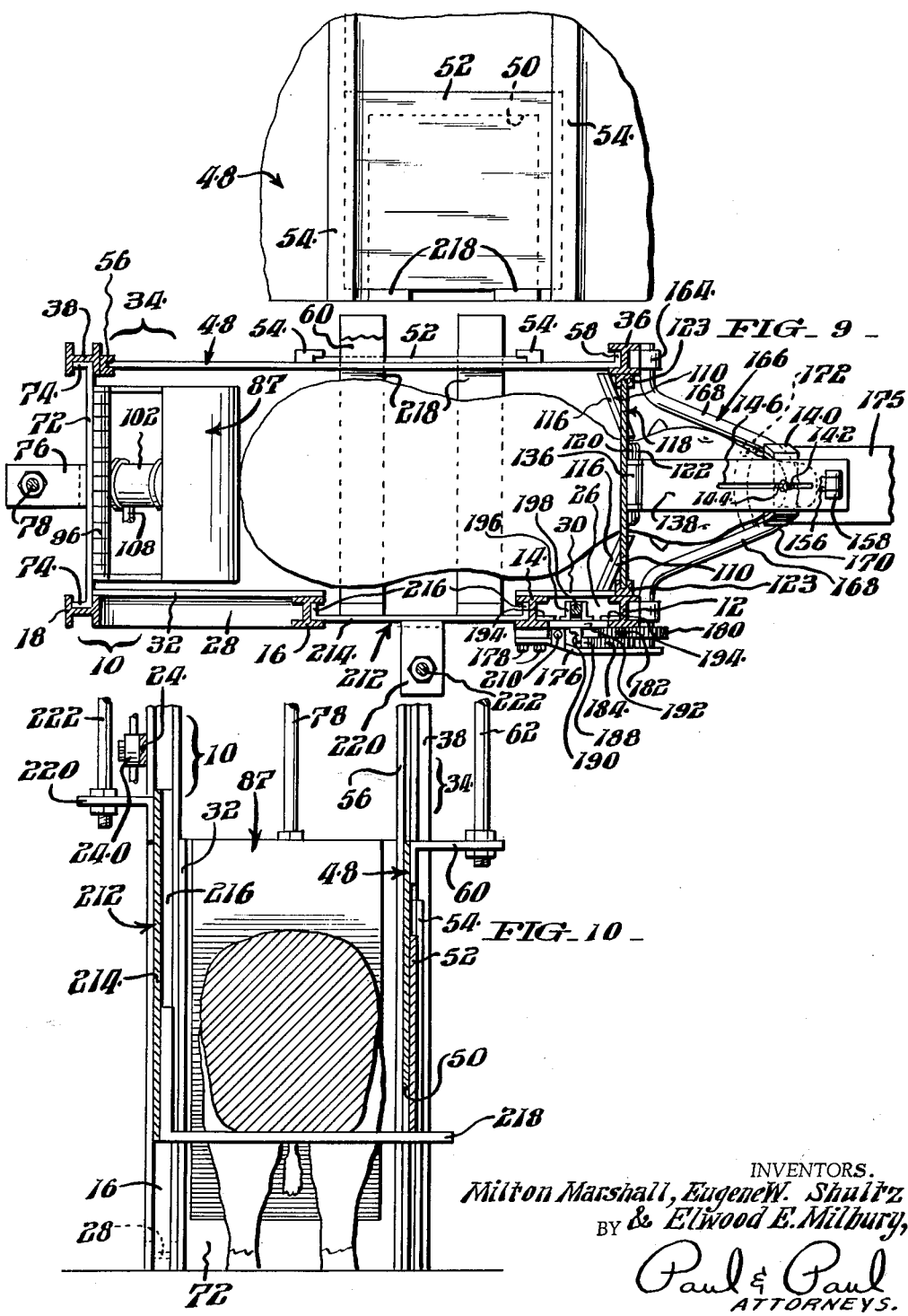

April 30, 1963  M. MARSHALL ETAL  3,087,195
APPARATUS FOR HOLDING CATTLE IN POSITION FOR SLAUGHTERING
Filed Aug. 23, 1961  7 Sheets-Sheet 5

INVENTORS.
Milton Marshall, Eugene W. Shultz
BY & Elwood E. Milbury,

Paul & Paul
ATTORNEYS.

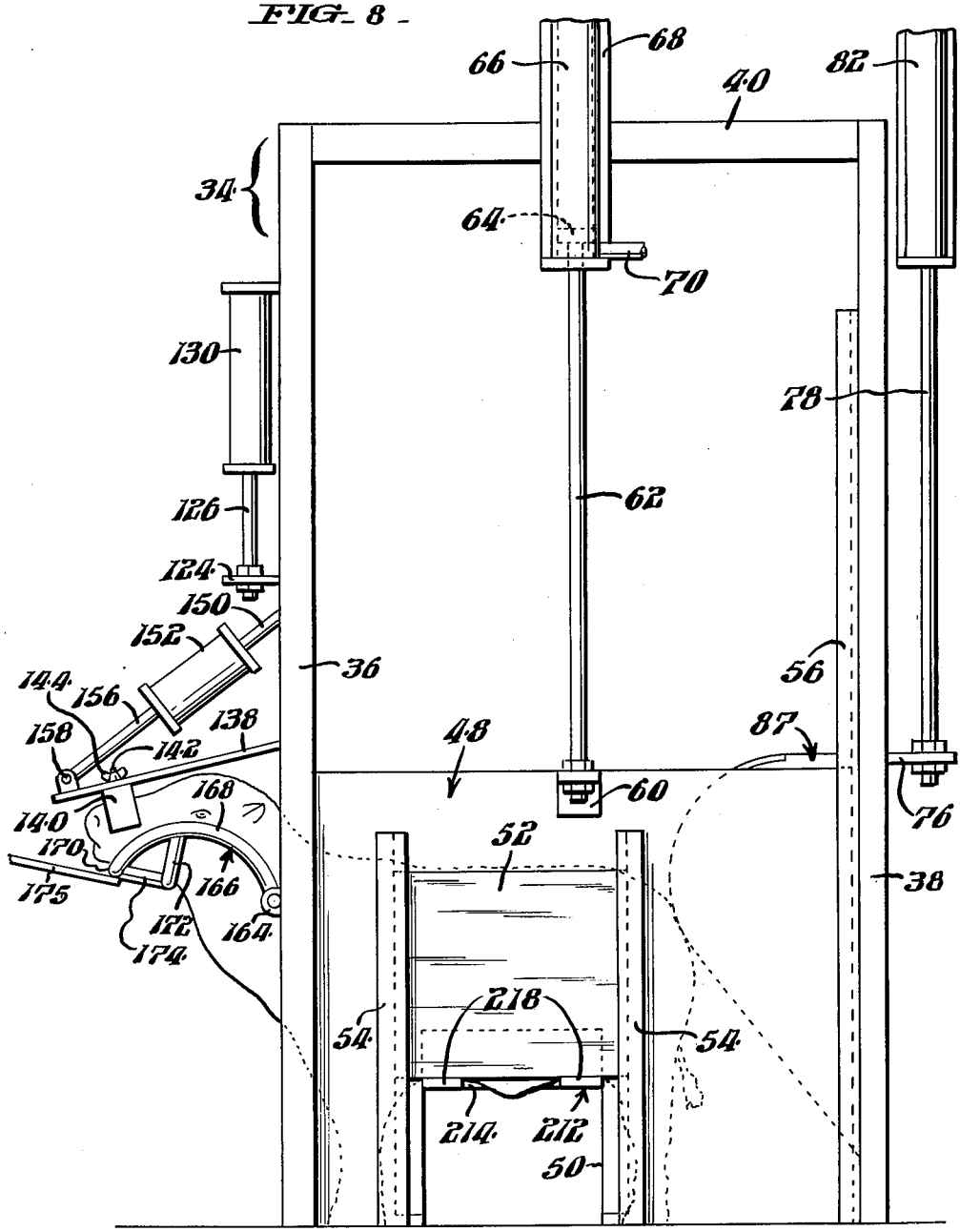

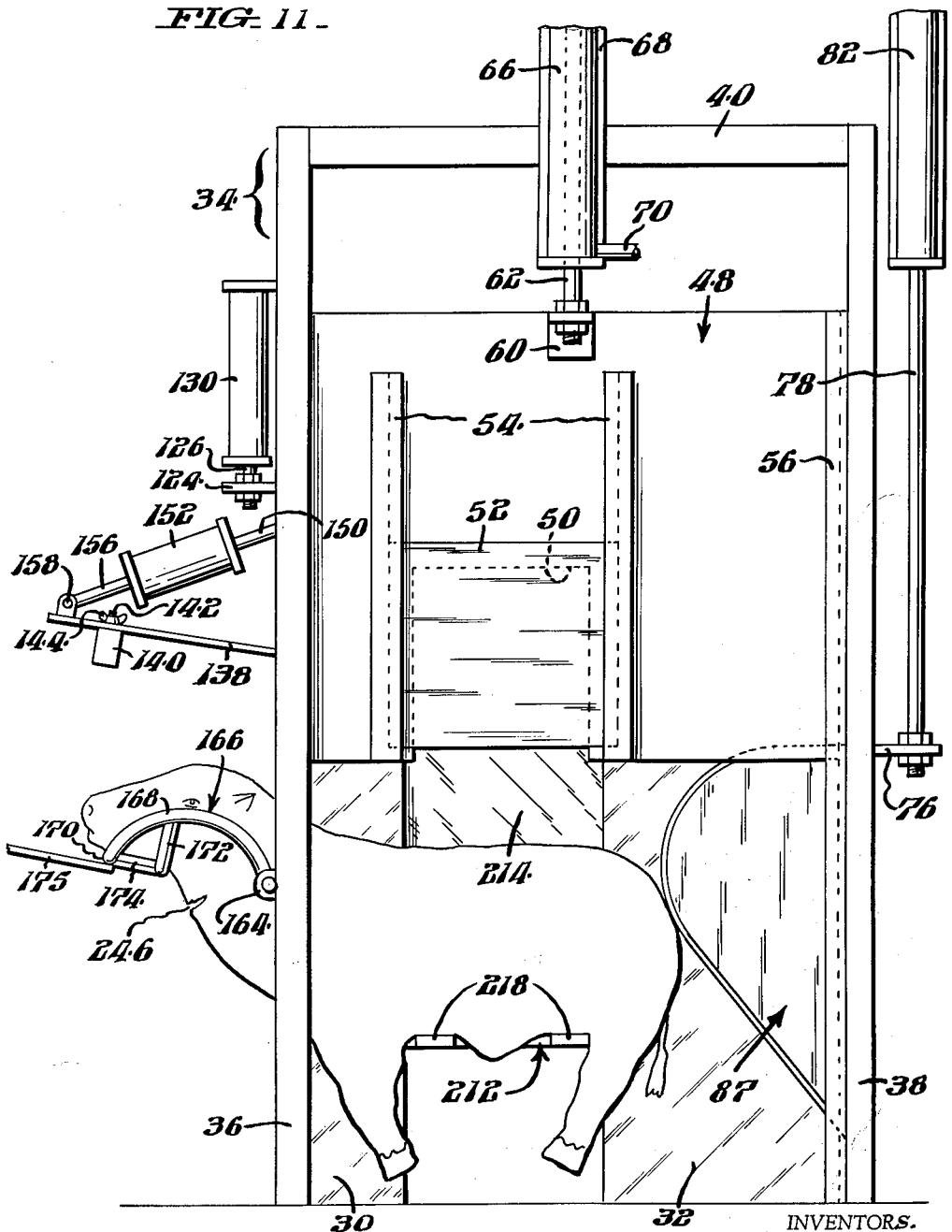

United States Patent Office 3,087,195
Patented Apr. 30, 1963

3,087,195
APPARATUS FOR HOLDING CATTLE IN POSITION FOR SLAUGHTERING
Milton Marshall, Oreland, Pa., Elwood E. Milbury, Collingswood, N.J., and Eugene W. Shultz, Philadelphia, Pa., assignors, by mesne assignments, to Humane Slaughtering Device Corporation, Philadelphia, Pa., a corporation of Pennsylvania
Filed Aug. 23, 1961, Ser. No. 133,372
3 Claims. (Cl. 17—1)

This invention relates generally to apparatus for slaughtering animals and particularly to apparatus for penning in and positioning cattle to facilitate slaughtering thereof.

An object of the invention is to provide improved apparatus for positioning an animal on all four feet with head erect and throat exposed for being cut, and for supporting the animal to keep it from falling to the floor of the pen after it is slaughtered.

Another object is to provide such apparatus which facilitates hoisting a slaughtered and shackled animal from the pen with a minimum of contact of the cut open throat of the animal with the upright walls of the pen.

Another object is to provide such apparatus including a lifting device operable for engaging the underbelly of an animal to keep its cut open throat from contacting the floor of the pen, thus preventing possible contamination.

Other objects of the invention will become apparent when the following description is read with reference to the accompanying drawings, in which:

FIG. 2 is a rear elevation of the pen;

FIG. 3 is a front elevation of the pen;

FIG. 4 is a fragmentary elevation of the opposite side of the pen;

FIG. 6 is similar to FIG. 2, but shows an animal fully penned in and positioned for being slaughtered;

FIG. 7 is similar to FIG. 3, but shows an animal fully penned in and positioned for being slaughtered;

FIG. 8 is an elevation of the opposite side of the pen, showing an animal fully penned in and positioned for being slaughtered;

FIG. 9 is a section on line IX—IX in FIG. 5;

FIG. 10 is a section on line X—X in FIG. 5; and

FIG. 11 is similar to FIG. 8, but shows the animal with its throat cut and its dead body elevated above the floor of the pen, one side of the pen being raised for removal of the animal bodily from the pen.

Figure 1:
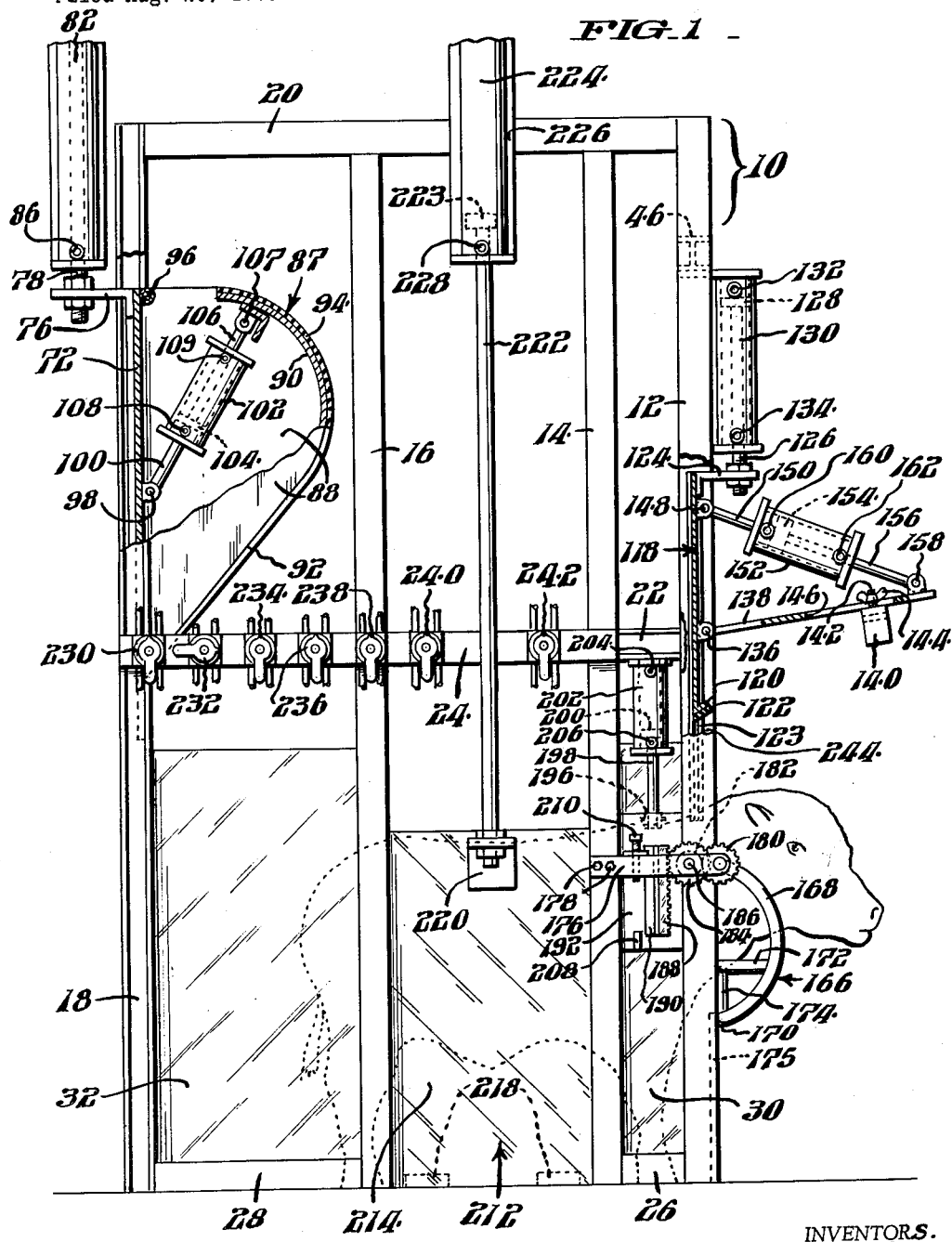
FIG. 1 is an elevation of one side of a pen embodying the invention, showing the condition thereof immediately after an animal is driven into it, parts being broken away and sectioned.

Referring particularly to FIG. 1, apparatus embodying the invention comprises an open rectangular rigid side frame, generally designated 10, which includes horizontally spaced column members 12, 14, 16, and 18 and a beam member 20 across the top thereof. Intermediate sections of columns 12 and 14 are tied together by a horizontally extending member 22, and intermediate sections of columns 14, 16, and 18 are tied together by a horizontally extending member 24. The lower ends of columns 12 and 14 are tied together by a horizontally extending member 26, and the lower ends of the columns 16 and 18 are tied together by a horizontally extending member 28. Extending upwardly from the tie member 26, between the columns 12 and 14, is a sheet metal side wall panel 30, and extending upwardly from the tie member 28, between the columns 16 and 18, is a sheet metal side wall panel 32.

Referring particularly to FIG. 8, the apparatus also includes a second open rectangular rigid side frame, generally designated 34, which includes horizontally spaced column members 36 and 38 and a beam member 40 across the top thereof.

Referring particularly to FIGS. 2 and 3, the upper ends of the columns 18 and 38 are rigidly tied together by a member 42, and the upper ends of the columns 12 and 36 are rigidly tied together by a pair of vertically spaced members 44 and 46.

Referring particularly to FIGS. 4 and 8 to 11, between columns 36 and 38 is a movable sheet metal side gate, generally designated 48. In the lower portion of the side gate is a rectangular opening 50 normally closed by a slide 52 guided by a pair of vertically extending members 54 affixed to the side gate 48. Affixed to the column 38 is a guide member 56, which is channeled to slidably receive a marginal side portion of the side gate 48. The opposite marginal side portion of the side gate 48 is provided with a flange 58 slidably received between the flanges of column 36. Affixed to the side gate 48 is a bracket 60, and connected to the bracket is the lower end portion of a rod 62, which extends upwardly from the bracket to a piston 64 working in a cylinder 66 mounted upon a bracket 68 preferably affixed to the structure of the building (not shown) housing the pen. Connected to opposite ends respectively of the cylinder 66 are fluid pressure conduits, of which only the conduit 70 is shown.

Referring particularly to FIGS. 1, 2, 5, 6, 9, and 10, between columns 18 and 38 is a movable sheet metal end gate 72 provided with opposite side flanges 74 each slidably received between the flanges of one of the columns. Affixed to the end gate 72 is a bracket 76, and connected to the bracket is the lower end portion of a rod 78, which extends upwardly from the bracket to a piston 80 working in a cylinder 82 affixed to the building structure. Connected to the opposite ends respectively of the cylinder 82 are fluid pressure conduits, of which only the conduit 86 is shown.

Carried by the end gate 72 is a bumper, generally designated 87. The bumper includes laterally spaced opposite side plate members 88 mounting a bumper plate which is rounded, as at 90, and sloped, as at 92. The bumper plate is covered with a sheet of rubber 94. The bumper 87 is hinged to the end gate 72, as at 96. Interposed between the end gate 72 and the bumper 87 is a fluid pressure motor pivoted, as at 98, to the end gate 72. Extending upwardly and inwardly from the pivot 98 is a rod 100 to which is affixed a cylinder 102. A piston 104 works in the cylinder 102 and has extending therefrom a rod 106, which is pivoted, as at 107, to the bumper plate. Connected to the opposite ends respectively of the cylinder 102 are fluid pressure conduits, designated 108 and 109.

Referring particularly to FIGS. 1, 3, 7, and 9, affixed respectively to the columns 12 and 36 are a pair of sheet metal front wall panels 110 widely separated from each other by a space 112. The upper ends of the panels 110 are rounded, as at 114, and the inner faces of the panels are lined with rubber, as at 116. Above the wall panels 110 is a yoke member, generally designated 118, mounting at the lower end thereof a collar 120 having an undersurface lined with rubber 122. Affixed respectively to the columns 12 and 36 are a pair of guide members 123, which slidably receive opposite side marginal portions of the yoke member 118. Affixed to the yoke member is a bracket 124, and connected to the bracket is the lower end portion of a rod 126, which extends upwardly from the bracket to a piston 128 working in a cylinder 130 depending from the beam 46. Connected to opposite ends respectively of the cylinder 130 are fluid pressure conduits, designated 132 and 134.

Pivoted to the yoke member 118, as at 136, is a plate 138, which carries a nose piece 140. Affixed to the nose piece is a stud 142, which has threaded thereon a wing nut 144. The stud 142 extends through a slot 146 in the plate 138. Interposed between the yoke member 118 and the plate 138 is a fluid pressure motor pivoted, as at 148, to the yoke member 118. Extending forwardly and downwardly from the pivot 148 is a rod 150 to which is affixed a cylinder 152. Working in the cylinder 152 is a piston 154 from which extends a rod 156 pivoted, as at 158, to the plate 138. Connected respectively to opposite ends of the cylinder 152 are fluid pressure conduits, designated 160 and 162.

Affixed to the columns 12 and 36 respectively are a pair of bearings 164, which receive respectively opposite end portions of a chin bar, generally designated 166. The chin bar is bent to provide opposite side curved portions 168 connected by an intermediate curved portion 170. Affixed to the bar 166 are a curved auxiliary bar 172 and straight auxiliary bars 174. The curved intermediate chin bar portion 170 and the auxiliary bars 172 and 174 conjointly form a chin rest from which freely extends a plate 175. In the lowered position of the chin bar, the plate 175 is received in the opening 112 between the front wall panels 110 (see FIG. 3). One end of the chin bar 166 extends freely through one end of a horizontally extending strap 176. The opposite end of the strap is affixed, as at 178, to the column 14. Affixed to the chin bar 166 is a gear 180 which meshes with a gear 182 affixed to a gear 184. The gears 182 and 184 are mounted upon a pintle 186 affixed by one end to the strap 176. Meshing with the gear 184 is a vertically extending rack 188 mounted by a bracket 190 upon a slide 192, which is guided by members 194 affixed respectively to columns 12 and 14. Affixed to the slide 192 is a bracket 196, which has connected thereto the lower end portion of a rod 198 extending upwardly to a piston 200 working in a cylinder 202 depending from the tie member 22. Connected to opposite ends respectively of the cylinder 202 are a pair of fluid pressure conduits 204 and 206. Mounted upon the slide 192 is a lug 208 aligned with an adjustable stop 210 carried by the strap 176.

The apparatus is provided with a lift fork, generally designated 212, including a plate 214 having opposite side flanges 216 slidably received respectively between the flanges of columns 14 and 16. Extending horizontally from the plate 214 across the floor of the pen in laterally spaced relation to each other are a pair of tines 218. Affixed to the plate 214 is a bracket 220, and connected to the bracket is the lower end portion of a rod 222, which extends upwardly to a piston 223 working in a cylinder 224 mounted upon a bracket 226 affixed to the building structure. Connected respectively to the opposite ends of the cylinder 224 are a pair of fluid pressure conduits, of which only the conduit 228 is shown.

Mounted upon the tie member 24 are an array of control valves 230, 232, 234, 236, 238, 240, and 242.

Initially the rod 222 of the fluid pressure motor comprising rod 222 and cylinder 224 is extended, in consequence of which the fork 212 is in its lowermost position, with tines 218 resting upon the floor of the pen, as in FIGS. 1 to 4. The rod 62 of the fluid pressure motor comprising rod 62 and cylinder 66 is extended, in consequence of which the side gate 48 is in its lowermost position, as in FIG. 8, and the slide 52 is in its lowermost position, as in FIG. 4. The rod 126 of the fluid pressure motor comprising rod 126 and cylinder 130 is in its retracted position, in consequence of which the yoke member 118 is in its raised position, as in FIG. 3. The rod 156 of the fluid pressure motor comprising rod 156 and cylinder 152 is in its retracted position, in consequence of which the plate 138 and nose piece 140 are in their raised positions, as in FIGS. 1, 3, and 11. The rod 78 of the fluid pressure motor comprising rod 78 and cylinder 82 is in its retracted position, in consequence of which the end gate 72 is in its raised position, as in FIGS. 1 and 2.

The rod 106 of the fluid pressure motor comprising rod 106 and cylinder 102 is in its retracted position, in consequence of which the bumper 87 is in its lowered, rearmost position, as in FIG. 1. The rod 198 of the fluid pressure motor comprising rod 198 and cylinder 202 is in its extended position, in consequence of which the chin bar 166 is in its lowermost position, as in FIGS. 1 and 3.

In the operation of the apparatus, the animal is driven into the pen, as shown in FIG. 1, and then valve 230 is operated to supply fluid pressure to cylinder 82 to extend the rod 78, whereupon the end gate 72 is lowered and closed. Then the valve 232 is operated to supply fluid pressure to cylinder 102 to extend rod 106, whereupon the bumper swings about its hinge 96 upwardly and forwardly to engage the butt of the animal and urge it toward the front of the pen to a position such that the head and neck of the animal extend freely through the opening, designated 244, below the yoke member 118, as in FIGS. 1 and 3. The extreme forward position of the bumper 87, for accommodating comparatively small animals, is indicated in phantom in FIG. 5.

Now valve 234 is operated to supply fluid pressure to the cylinder 130 to extend the rod 126, whereupon the yoke member 118 is lowered to position the collar 120 about four inches above the neck of the animal.

Now valve 236 is operated to supply fluid pressure to cylinder 202 to retract rod 198, slide 192 and rack 188, whereupon, through the gears 184, 182, and 180, the chin bar 166 and plate 175 are raised. As the bar swings upwardly and forwardly, it catches the animal under the chin and raises its neck to the collar 120, exposing the throat of the animal for being cut. Movement of the chin bar is limited by engagement of the lug 208 with the adjustable stop 210.

Figure 5:
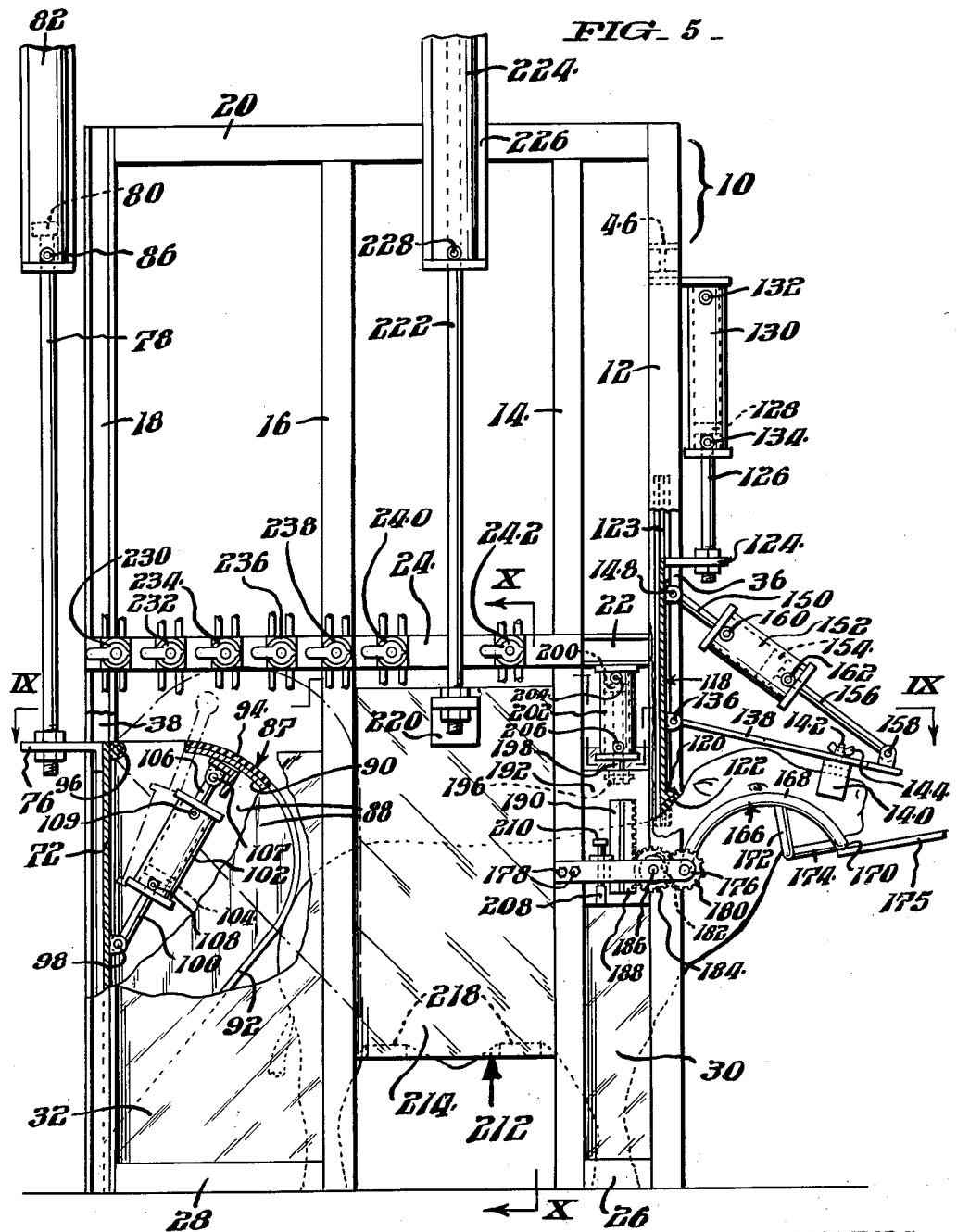
FIG. 5 is similar to FIG. 1, but shows an animal fully penned in and positioned for being slaughtered.

Then valve 238 is operated to supply fluid pressure to the cylinder 224 to retract the rod 222, in consequence of which fork 212 is raised so that the tines 218 engage the underbelly of the animal, as in FIGS. 5, 8, and 10. As the fork is elevated, the tines 218 raise the slide 52 from the position of FIG. 4 to the position of FIG. 8.

Now valve 242 is operated to supply fluid pressure to cylinder 152 to extend rod 156, whereupon the plate 138 is lowered and the piece 140 carried thereby engages with the nose of the animal. Of course, the nut 144 may be loosened and the nose piece 140 shifted as desired lengthwise of the plate 138.

The animal thus restrained is ready to be slaughtered. Accordingly, its throat is cut, as at 246, and it slumps onto the tines 218.

Then valve 240 is operated to supply fluid pressure to cylinder 66 to retract rod 62, whereupon side gate 48 is raised about five inches to allow the operator to reach under the side gate 48 to shackle one of the hind legs of the animal. Now the valve 240 is again operated to supply fluid pressure to cylinder 66 to retract rod 62 still farther and to fully raise side gate 48. Initially slide 52 does not move upwardly with side gate 48, i.e., lost motion occurs until the bottom of side gate 48 reaches tines 218, whereupon slide 52 and gate 48 move upwardly as a unit, as in FIG. 11.

Now valve 236 is operated to supply fluid pressure to cylinder 202 to again extend rod 198, slide 192 and rack 188. Thus gears 184, 182, and 180 are turned and chin bar 166 and plate 175 are relowered to their initial positions.

Then valves 242 and 234 are operated to supply fluid pressure respectively to the cylinders 152 and 130, whereupon the rods 156 and 126 are retracted and the plate 138 and yoke member 118 are returned to their initial positions.

Now the shackled animal is hoisted directly from the tines 218 through the opening in the side of the pen. The body of the animal is not permitted to touch the floor, and the cut open throat of the animal cannot touch any part of the pen, the fork 212 being suitably raised and lowered to facilitate the operation.

After the pen is thoroughly cleaned, the valve 238 is operated to supply fluid pressure to the cylinder 224 to again extend the rod 222 and relower the fork 212 to the floor of the pen.

Now valve 240 is operated to supply fluid pressure to cylinder 66 to again extend rod 62 and relower side gate 48 and slide 52 to their initial positions.

Then valves 232 and 230 are operated to supply fluid pressure respectively to cylinders 102 and 82 to retract rods 106 and 78 and return the bumper 87 and end gate 72 to their initial positions.

The pen is now ready to receive the next animal.

It will be understood, of course, that the present invention, as shown and described, is susceptible to various changes and modifications which may be made without any departure from the general principles or real spirit of the invention. Accordingly, it is intended to claim the same broadly, as well as specifically, as indicated in the appended claims.

Having thus described our invention, we claim as follows:

1. Apparatus for holding cattle and like animals to facilitate slaughtering thereof comprising means providing an enclosure for penning in an animal on all sides thereby to restrain the animal from movement fore and aft and to either side including a rigid frame structure, means mounted on said frame structure providing said enclosure with a stationary side wall, means mounted on said frame structure providing said enclosure with a movable opposite side wall operable to afford an opening through which the animal may be removed bodily from said enclosure after it is slaughtered, rigid lift means close adjacent the floor of said enclosure and extending horizontally freely through said stationary side wall to said movable side wall, means on said stationary side wall slidably mounting said lift means for vertical movement, said lift means being operable for engaging with the underbelly of the animal to force the animal to stand upright in said enclosure on all four feet before it is slaughtered and to support the body of the animal to keep it from falling to the floor of the enclosure after it is slaughtered, and fluid motor means mounted on said enclosure for actuating said lift means.

2. Apparatus for holding cattle and like animals to facilitate slaughtering thereof comprising means providing an enclosure for penning in an animal on all sides thereby to restrain the animal from movement fore and aft and to either side including a rigid frame structure, means mounted on said frame structure providing said enclosure with a stationary side wall, means mounted on said frame structure providing said enclosure with a movable opposite side wall operable to afford an opening through which the animal may be removed bodily from said enclosure after it is slaughtered, lift fork means including a pair of laterally spaced tines extending horizontally freely through said stationary side wall to said movable side wall, means on said stationary side wall slidably mounting said fork means for vertical movement to bring said tines into engagement with the underbelly of the animal, respectively immediately behind the fore legs and immediately in front of the hind legs, to force the animal to stand upright in said enclosure on all four feet before it is slaughtered and to support the body of the animal to keep it from falling to the floor of the enclosure after it is slaughtered, and fluid motor means mounted on the outside of said enclosure for actuating said fork means.

3. Apparauts for holding cattle and like animals to facilitate slaughtering thereof comprising means providing an enclosure for penning in an animal on all sides thereby to restrain the animal from movement fore and aft and to either side including a rigid frame structure, means mounted on said frame structure providing said enclosure with a stationary side wall, means mounted on said frame structure providing said enclosure with a movable opposite side wall operable to afford an opening through which the animal may be removed bodily from said enclosure after it is slaughtered, rigid lift means close adjacent the floor of said enclosure and extending horizontally freely through openings in said opposite side walls, a closure over the opening in said movable side wall carried by said lift means, means on said side walls slidably mounting said lift means and said closure for vertical movement, said lift means being operable for raising said closure and for engaging with the underbelly of the animal to force the animal to stand upright in said enclosure on all four feet before it is slaughtered and to support the body of the animal to keep it from falling to the floor of the enclosure after it is slaughtered, and fluid motor means mounted on said enclosure for actuating said lift means and closure.

References Cited in the file of this patent

UNITED STATES PATENTS

| 1,487,935 | Gray | Mar. 25, 1924 |
| 2,672,126 | Linton | Mar. 16, 1954 |

FOREIGN PATENTS

| 14,348 | Great Britain | 1915 |